United States Patent
Takechi et al.

(10) Patent No.: US 6,300,406 B1
(45) Date of Patent: Oct. 9, 2001

(54) MODERATELY ELECTRICALLY CONDUCTING RESIN COMPOSITION AND MOLDED ARTICLE THEREOF

(75) Inventors: Shigetoshi Takechi; Kazuki Okunaka, both of Kagawa-ken; Hideyuki Akaki, Marugame; Kunio Kanaoka, Sakaide; Yoshihiro Tange, Marugame, all of (JP)

(73) Assignee: Okura Industrial Co., Ltd. (JP)

( * ) Notice: Subject to any disclaimer, the term of this patent is extended or adjusted under 35 U.S.C. 154(b) by 0 days.

(21) Appl. No.: 09/222,821

(22) Filed: Dec. 30, 1998

(51) Int. Cl.$^7$ .............................. C08J 5/10; C08K 3/04; C08L 27/16
(52) U.S. Cl. .................... 524/495; 524/496; 523/215
(58) Field of Search ....................... 524/495, 496; 523/215

(56) References Cited

U.S. PATENT DOCUMENTS 5,952,429 * 9/1999 Ikeda et al. .................. 525/326.1

FOREIGN PATENT DOCUMENTS

409324133 * 12/1997 (JP).
410007865 * 1/1998 (JP).

* cited by examiner

Primary Examiner—James J. Seidleck
Assistant Examiner—U. K. Rajguru
(74) Attorney, Agent, or Firm—Lorusso & Loud

(57) ABSTRACT

A resin composition containing 100 parts by weight of a thermoplastic fluorine-containing resin, 1–40 parts by weight of polymer-grafted carbon black, 1–15 parts by weight of a thermoplastic polyether resin, and 0–2 parts by weight of an electrolyte. An endless seamless belt having the above composition is suited as an intermediate image transfer element for an electrophotographic image forming apparatus.

12 Claims, 1 Drawing Sheet

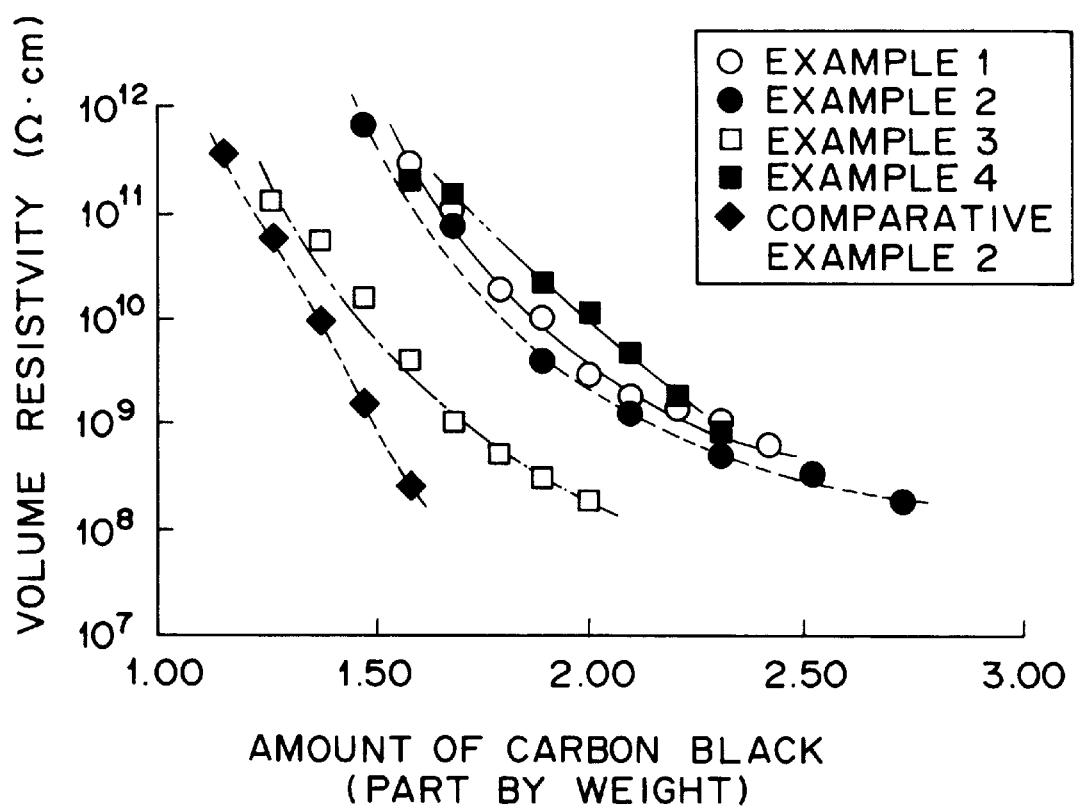
F I G. 1

MODERATELY ELECTRICALLY CONDUCTING RESIN COMPOSITION AND MOLDED ARTICLE THEREOF

BACKGROUND OF THE INVENTION

This invention relates to a moderately electrically conducting resin composition and to a molded article obtained from such a resin.

JP-A-H7-113029 discloses a moderately electrically conducting resin composition which includes a polyvinylidene fluoride resin, carbon black and a thermoplastic polyether resin and which is used for producing molded articles. The known composition has a problem because it is necessary to strictly control the amount of the carbon black and the mixing conditions in order to obtain a desired electric conductivity.

Additionally, the electric conductivity (or electric resistivity) of a molded product obtained from the known composition depends upon a voltage applied thereto and, moreover, varies when subjected to repeated voltage impression. Thus, if such a composition is used for an intermediate image transfer element of an electrophotographic image forming apparatus, an image density is apt to change upon repeated uses.

SUMMARY OF THE INVENTION

It is, therefore, an object of the present invention to provide a moderately electrically conducting resin composition whose electric resistivity can be accurately and easily controlled and which can give a molded product having a uniform electric resistivity throughout its whole body.

Another object of the present invention is to provide a moderately electrically conducting resin composition whose electric resistivity is low in voltage dependency or environment dependency.

It is a further object of the present invention to provide a moderately electrically conducting resin composition whose electric resistivity does not significantly vary even when subjected to repeated voltage application.

It is yet a further object of the present invention to provide a seamless endless belt suitable as an intermediate image transfer element for an electrophotographic image forming apparatus.

It is still yet a further object of the present invention to provide a molded article having excellent workability and physical and mechanical properties.

In accordance with the present invention there is provided a resin composition comprising 100 parts by weight of a thermoplastic fluorine-containing resin, 1–40 parts by weight of polymer-grafted carbon black, 1–15 parts by weight of a thermoplastic polyether resin, and 0–2 parts by weight of an electrolyte.

The present invention also provides a molded article obtained from the above resin composition.

In the present specification and appended claims, the term "volume resistivity" is as measured at 23° C. under a relative humidity of 50% with an impressed voltage of 500 V. An electric resistivity measuring device (HIRESTA IP manufactured by Mitsubish Chemical Corporation with an HRS probe) is used for measuring a volume resistivity.

BRIEF DESCRIPTION OF THE DRAWING

Other objects, features and advantages of the present invention will become apparent from the detailed description of the preferred embodiments which follows, when considered in light of the accompanying drawing, in which:

FIG. 1 is a graph showing a relationship between the amount of carbon black and the volume resistivity.

DETAILED DESCRIPTION OF THE PREFERRED EMBODIMENTS OF THE INVENTION

The resin composition according to the present invention is moderately electrically resisting and has a volume resistivity in the range of $1 \times 10^5 – 1 \times 10^{12}$, preferably $1 \times 10^5 – 1 \times 10^{10}$. The resin composition includes 100 parts by weight of a thermoplastic fluorine-containing resin, 1–40 parts by weight of polymer-grafted carbon black, 1–15 parts by weight of a thermoplastic polyether resin, and 0–2 parts by weight of an electrolyte.

The thermoplastic fluorine-containing resin may be, for example, polyvinylidene fluoride, a tetrafluoroethylene-ethylene copolymer, a tetrafluoroethylene-hexafluoropropylene copolymer, a tetrafluoroethylene-perfluoroalkyl vinyl ether copolymer, polytrifluorochloroethylene, a polytrifluorochloroethylene-vinylidene fluoride-hexafluoropropylene copolymer, a vinylidene fluoride-tetrafluoroethylene-hexafluoropropylene copolymer or a graft copolymer of vinylidene fluoride-hexafluoropropylene copolymer with vinylidene fluoride. These polymers and copolymers may be used by themselves or as a mixture of two or more. The use of polyvinylidene fluoride or a copolymer thereof is preferred for reasons of moldability and workability.

The polymer-grafted carbon black is carbon black to which a polymer is grafted or linked through, for example, covalent bonding.

Any carbon black such as furnace black, channel black or acetylene black may be used for the preparation of the polymer-grafted carbon black. It is preferred that the carbon black have an average particle diameter of 35 nm or less because the amount of the carbon black can be reduced.

The polymer-grafted carbon black may be obtained by chemically bonding a polymer, an oligomer or a monomer, which can form a graft chain, to carbon black using free radicals, carboxyl groups or other active species which are present on surfaces of carbon black particles. For example, the polymer-grafted carbon black may be obtained by a method in which a monomer having a polymerizable double bond is subjected to radical polymerization using a radical generating agent in the presence of carbon black, so that polymer chains bonded to the carbon black through radical coupling between polymer radicals and radicals on the carbon black. Examples of such monomers include alkyl acrylates, alkyl methacrylates, styrene, vinyl acetate, olefins and mixtures thereof.

Alternatively, a first monomer (bifunctional monomer) having both an active group, such as an epoxy group, an oxazoline group or an amino group, and a polymerizable double bond and a second monomer having a polymerizable double bond are subjected to radical polymerization in the presence of carbon black, so that polymer chains of the first and second monomers are formed with the active group of the first monomer being reacted with carboxyl groups of the carbon black. Examples of the second monomers include alkyl acrylates, alkyl methacrylates, styrene, vinyl acetate, olefins and mixtures thereof. Examples of the first monomers include glycidyl acrylate, glycidyl methacrylate, oxazoline acrylate, oxazoline methacrylate, allylamine and oxazoline malate and mixtures thereof.

A further method for the preparation of the polymer-grafted carbon black includes reacting a polymer having an active group such as an epoxy group, an oxazoline group or an amino group is kneaded with carbon black at an elevated temperature so that the polymer is grafted to the carbon black through the active group.

In the present invention, the polymer-grafted carbon black can contain a minor amount of an unreacted polymer which is not bonded to the carbon black and/or a minor amount of carbon black to which a polymer is not grafted.

It is preferred that the amount of the graft polymer (a total amount of monomer, oligomer or polymer used for grafting) be 10–90% by weight, more preferably 20–70% by weight, based on the polymer-grafted carbon (a sum of the amount of the carbon black and a total amount of a monomer, oligomer or polymer used for grafting). Too large an amount of the graft polymer above 90% by weight requires a large amount of the polymer-grafted carbon in order to obtain a desired resistivity. When the amount of the graft polymer is below 10% by weight, the effect of the present invention is not significantly obtained. However, the above amount of the graft polymer in the polymer-grafted carbon black is not critical for the purpose of the present invention.

It is important that the polymer-grafted carbon black be used in an amount of 1–40 parts by weight per 100 parts by weight of the thermoplastic fluorine-containing resin. When the amount of the polymer-grafted carbon exceeds 40 parts, the resin composition fails to show desired properties of the fluorine resin and, further, the workability thereof becomes poor. On the other hand, desired moderate electric conductivity is not obtainable with too low an amount of the polymer-grafted carbon below 1 part by weight.

It is essential that the resin composition should contain a thermoplastic polyether resin in addition to the above thermoplastic fluorine-containing resin and the polymer-grafted carbon black. The polyether resin is preferably a polymer having molecular weight of at least 3,000 and containing a polyalkylene oxide chain. Illustrative of suitable polyether resins are polyethylene oxides, copolymers of ethylene oxide with propylene oxide, copolymers of ethylene oxide with epichlorohydrin, poly(meth)acrylates having polyethylene oxide side chains, polyether ester amides, polyether esters, polyether urethanes and polyether ester urethanes. It is important that the amount of the polyether resin should be 1–15 parts by weight per 100 parts by weight of the fluorine-containing resin. When the amount of the polyether resin exceeds 15 parts, the workability of the resin composition becomes poor. On the other hand, desired accuracy and easiness in control of the electric resistivity of the resin composition cannot be obtained with too low an amount of the polyether resin below 1 part by weight.

It is preferred that the resin composition according to the present invention further contain an electrolyte because the amount of the polymer-grafted carbon black can be reduced while maintaining desired electric conductivity. Examples of electrolytes include inorganic salts such as alkali metal or alkaline earth metal salts of thiocyanic acid, phosphoric acid, sulfuric acid or halogen-containing oxyacids and alkali metal or alkaline earth metal halides. Above all, the use of potassium thiocyanate, sodium thiocyanate, lithium thiocyanate, potassium perchlorate, sodium or lithium perchlorate is particularly preferred. The amount of the electrolyte is 0–2 parts by weight, preferably 0.05–2 parts by weight, per 100 parts by weight of the fluorine-containing resin.

The resin composition may contain one or more additives such as an anti-oxidation agent, anti-blocking agent, a lubricant, a processing aid, a synthetic resin other than the above-mentioned and a coloring agent.

The resin composition may be prepared by mixing the above-described ingredients with a suitable mixer such as a kneader, a roll mixer, Banbury mixer or a dual axis mixer and may be in the form of powder, granules, pellets and molded bodies such as films, sheets, plates, blocks, pipes, tubes and belts.

The following examples will further illustrate the present invention. Parts are by weight.

REFERENCE EXAMPLES 1–4 AND 6

Preparation of Polymer for Grafting

In a reactor equipped with a stirrer and a nitrogen gas feed pipe, 100 parts of a mixture of a graft monomer and glycidyl methacrylate as shown in Table 1 below, 0.5 part of carbon tetrabromide (a chain transfer agent), 1 part of azobis (isobutyronitrile) (a radical generator) and 100 parts of an aqueous solution containing 1% by weight of polyvinyl alcohol (a monomer dispersing aid) were charged. The contents in the reactor were then reacted at 80° C. with vigorous stirring for 10 hours in a nitrogen flow. The reaction mixture was filtered, washed and dried to obtain a polymer for grafting. The yield is shown in Table 1.

TABLE 1

| Reference Example No. | Graft Monomer and Amount (part) | Glycidyl methacrylate (part) | Yield (%) |
|---|---|---|---|
| 1 | Ethyl methacrylate: 75 | 25 | 96 |
| 2 | Styrene: 75 | 25 | 94 |
| 3 | Styrene: 70 Butyl methacrylate: 25 | 5 | 98 |
| 4 | Styrene: 32 Methyl methacrylate: 65 | 8 | 97 |
| 6 | Styrene: 70 Butyl methacrylate: 22 | 8 | 98 |

REFERENCE EXAMPLE 5

Preparation of Carbon Black Compound

Carbon black (5 parts; Ketjen Black EC-600JD manufactured by Ketjen Black International Company) was mixed with 95 parts of a fluorine elastomer (a graft copolymer obtained by grafting vinylidene fluoride onto a vinylidene fluoride-hexafluoropropylene copolymer; Cefral Soft G-180 manufactured by Central Glass Co., Ltd.) using a dual axis mixer to obtain a carbon black compound.

EXAMPLE 1

Preparation of Moderately Electrically Conducting Composition

A quantity of the carbon black compound obtained in Reference Example 5 and a quantity of the polymer for grafting obtained in Reference Example 1 were charged in a mixer (Raboplast Mill manufactured by Toyo Seiki Seisakusho Ltd.) and the mixture was kneaded and reacted at 175° C. for 30 minutes to obtain a polymer-grafted carbon black master batch (1) having a graft polymer content (weight percentage of the polymer for grafting based on the weight of the polymer-grafted carbon black (a total weight of the carbon black and the polymer for grafting)) of 50% by weight.

Quantities of the master batch (1) were each mixed with 100 parts of polyvinylidene fluoride (KYNAR710 manufactured by Elf Atochem North America Inc.) and 5.3 parts of polyether ester amide (PAS40T manufactured by Toray Co., Ltd.) using a dual roll mixer to obtain a number of moderately electrically conducting compositions having contents of the polymer-grafted carbon black in the range of 3.1–5.1 parts.

Preparation of Film

Each of the thus obtained compositions was hot-pressed at 190° C. for 10 minutes to obtain films having a thickness of 180 μm. Each of the films was measured for its volume resistivity at various positions thereof. It was found that variation of the resistivity of each of the films was such that the ratio of the maximum resistivity to the minimum resistivity of the same film was within 5. The relationship between the average volume resistivity of the films and the amount of the polymer-grafted carbon black (calculated in terms of the amount of carbon black) is shown in FIG. 1.

EXAMPLES 2–4

Example 1 was repeated in the same manner as described except that each of the polymers for grafting obtained in Reference Examples 2–4 was substituted for the polymer for grafting obtained in Reference Example 1, thereby obtaining polymer-grafted carbon black master batches (2)–(4), respectively, each having a graft polymer content of 33% by weight.

Each of the master batches (2)–(4) was used to prepare, in the same manner as that in Example 1, a number of moderately electrically conducting compositions having contents of the polymer-grafted carbon black in the ranges summarized in Table 2.

Each of the thus obtained compositions was hot-pressed at 190° C. for 10 minutes to obtain films having a thickness of 180 μm. Each of the films was measured for its volume resistivity at various positions thereof. It was found that variation of the resistivity of each of the films was such that the ratio of the maximum resistivity to the minimum resistivity of the same film was within 5. The relationship between the average volume resistivity oif the films and the amount of the polymer-grafted carbon black (calculated in terms of the amount of carbon black) is shown in FIG. 1.

TABLE 2

| Example No. | Graft Polymer Content | Master Batch | Main Graft Chain | Amount of polymer-grafted carbon black (part) |
|---|---|---|---|---|
| 1 | 50 wt % | No. 1 | polyethyl methacrylate | 3.1–5.1 |
| 2 | 33 wt % | No. 2 | polystyrene | 2.2–4.3 |
| 3 | 33 wt % | No. 3 | styrene-butyl methacrylate copolymer | 1.9–3.2 |
| 4 | 33 wt % | No. 4 | methyl methacrylate-styrene copolymer | 2.6–3.6 |
| Comparative Ex. 2 | none | none | none | 1.1–1.6* |

*amount of carbon black

Comparative Example 1

Carbon black compound (4.4 parts) obtained in Reference Example 5 was mixed with 5.6 parts of polyvinylidene fluoride (KYNAR710 manufactured by Elf Atochem North America Inc.) using a dual roll mixer to obtain a moderately electrically conducting composition. The thus obtained composition was hot-pressed at 190° C. for 10 minutes to obtain a film having a thickness of 180 μm. The film was measured for its volume resistivity at various positions thereof. It was found that the resistivity varied place to place in the same film from $8 \times 10^5$ to $2 \times 10^9$ Ω·cm, i.e. the ratio of the maximum resistivity to the minimum resistivity of the same film was $2.5 \times 10^3$.

Comparative Example 2

Quantities of the carbon black compound obtained in Reference Example 5 were each mixed with 100 parts of polyvinylidene fluoride (KYNAR710 manufactured by Elf Atochem North America Inc.) and 5.3 parts of polyether ester amide (PAS40T manufactured by Toray Co., Ltd.) using a dual roll mixer to obtain a number of moderately electrically conducting compositions having contents of the carbon black compound in the range of 1.1–1.6 parts. Each of the thus obtained compositions was hot-pressed at 190° C. for 10 minutes to obtain films having a thickness of 180 μm. The relationship between the average volume resistivity of the films and the amount of the carbon black compound (in terms of the amount of carbon black) is shown in FIG. 1.

As will be appreciated from the foregoing, the composition of Comparative Example 1 which contains neither thermoplastic polyether resin nor polymer-grafted carbon black is ill-suited for actual application because the variation of the resistivity in the molded article obtained therefrom is significant. The composition of Comparative Example 2 which contains carbon black having no grafted polymer is unsatisfactory because the resistivity significantly varies even with a slight variation of the amount of the carbon black (see FIG. 1). In contrast, the molded product obtained from the compositions according to the present invention has uniform resistivity. Further, since a change in resistivity thereof by a change in the carbon black content is small, it is possible to obtain molded products having a desired electric resistivity in a stable manner.

EXAMPLE 5

Parts of polyvinylidene fluoride (KYNAR710), 7 parts of carbon black (Toka Black #7550 manufactured by Tokai Carbon Co., Ltd.) and 3.5 parts of the polymer for grafting obtained in Reference Example 1 were charged in a mixer (Raboplast Mill) and the mixture was kneaded and reacted at 175° C. for 30 minutes to obtain a polymer-grafted carbon black master batch (5) having a graft polymer content of 33% by weight. 5.5 Parts of the master batch (5), 5.9 parts of polyvinylidene fluoride (KYNAR710) and 0.6 part of polyether ester amide (PAS40T) were mixed with each other using a dual roll mixer to obtain a moderately electrically conducting composition having a polymer-grafted carbon black content of 8.9 parts (5.9 parts in terms of carbon black). The thus obtained composition was hot-pressed at 190° C. for 10 minutes to obtain a film having a thickness of 180 μm. The films was measured for its volume resistivity at various positions thereof. It was found that the resistivity of the film ranged from $2.2 \times 10^8$ to $7.3 \times 10^8$ (at impressed voltage of 500 V) in the same film.

EXAMPLE 6

70 Parts of the carbon black compound obtained in Reference Example 5 and 1.75 parts of the polymer for grafting obtained in Reference Example 1 were charged in a mixer (Raboplast Mill) and the mixture was kneaded and reacted at 175° C. for 30 minutes to obtain a polymer-grafted carbon black master batch (6) having a graft polymer content of 33% by weight. 3 Parts of the master batch (6), 6.5 parts of polyvinylidene fluoride (KYNAR710), 0.5 part of polyether ester amide (PAS40T) and 0.03 part of lithium perchlorate were mixed with each other using a dual roll mixer to obtain a moderately electrically conducting composition having a polymer-grafted carbon black content of 1.9 parts (1.3 parts in terms of carbon black). The thus obtained composition was hot-pressed at 190° C. for 10 minutes to obtain a film having a thickness of 180 μm. The film was measured for its volume resistivity at various positions thereof. It was found that the resistivity of the film ranged from $1.4 \times 10^9$ to $5.6 \times 10^9$ (at impressed voltage of 500 V) in the same film.

EXAMPLE 7

A film having a polymer-grafted carbon black content of 4.9 parts (2.4 parts in terms of carbon black) as prepared in Example 1 was provided.

EXAMPLE 8

A film having a polymer-grafted carbon black content of 3.3 parts (2.2 parts in terms of carbon black) as prepared in Example 2 was provided.

Comparative Example 3

A film having a carbon black content of 1.6 parts as prepared in Comparative Example 2 was provided.

Each of the films of Examples 5–8 and Comparative Example 3 was measured for its volume resistivities at different impressed voltages of 100 V and 500 V and at different conditions of 30° C.-80% RH (relative humidity) and 10° C.-30% RH. The ratio of the volume resistivity at 100 V to the volume resistivity at 500 V (Voltage Dependency) and the ratio of the volume resistivity at 30° C.-80% RH to the volume resistivity at 10° C.-30% RH (Environment Dependency) were calculated. The results are summarized in Table 3.

TABLE 3

| Ex- ample No. | Content of Carbon Black (part) | Volume Resistivity 100 V | 500 V | Voltage Dependency | Environment Dependency |
| --- | --- | --- | --- | --- | --- |
| 5 | 5.9 | $2.5 \times 10^9$ | $4.2 \times 10^8$ | 6.0 | 5.8 |
| 6 | 1.3 | $1.5 \times 10^{10}$ | $2.8 \times 10^9$ | 5.4 | 5.9 |
| 7 | 2.4 | $8.3 \times 10^9$ | $1.1 \times 10^9$ | 7.5 | 5.5 |
| 8 | 2.2 | $7.1 \times 10^9$ | $1.0 \times 10^8$ | 7.1 | 3.4 |
| Comp. Ex. 3 | 1.6 | $3.6 \times 10^9$ | $2.6 \times 10^8$ | 13.8 | 5.5 |

As will be appreciated from the results shown in Table 3, the film of Comparative Example 3 which contains carbon black having no graft polymer shows a significant change in resistivity at different applied voltages. The film of Example 6 containing an electrolyte shows a volume resistivity comparable to those of Examples 5, 7 and 8 even with a small amount of carbon black. Reduction of the amount of carbon black is desirable because the composition can contain a larger amount of the fluorine resin, so that the desired properties of the fluorine resin can be retained.

The compositions of Examples 1–8 were formed into pellets and extruded through a circular die to form tubular films. Each of the tubular films was cut to obtain seamless endless belts. Each of the endless belts was found to be suited for use as an intermediate image transfer element for an electrophotographic image forming apparatus.

EXAMPLE 9

100 Parts of the carbon black compound obtained in Reference Example 5 and 15 parts of the polymer for grafting obtained in Reference Example 6 were charged in a mixer (Raboplast Mill) and the mixture was kneaded and reacted at 180° C. for 30 minutes to obtain a polymer-grafted carbon black master batch (9) having a graft polymer content of 75% by weight. 32.8 Parts of the master batch (9), 70 parts of polyvinylidene fluoride (KYNAR710), 2.9 parts of a fluorine elastomer (Cefral Soft G-180) and 4 parts of polyether ester amide (PAS40T) were mixed with each other using a dual roll mixer and the thus obtained moderately electrically conducting composition was pelletized and then extruded through a circular die having a diameter of 120 mm to obtain a tubular film having a thickness of 150 μm and an outer peripheral length of 470 mm. The tubular film was cut to obtain an endless seamless belt. The belt was measured for its volume resistivity at various positions thereof. It was found that the resistivity of the belt ranged from $8.5 \times 10^8$ to $6.7 \times 10^9$ (at impressed voltage of 250 V) in the same belt. The thus obtained seamless belt was impressed with a voltage of 500 V for 10 seconds and then allowed to stand with no voltage being applied thereto for 50 seconds. Such an intermittent voltage application was repeated 1000 times (the test was thus continued for 1000 minutes). The volume resistivities of the seamless belt before and after the test were measured. The ratio of the volume resistivity after the test to the volume resistivity before the test was found to be 9.2.

EXAMPLE 10

100 Parts of the carbon black compound obtained in Reference Example 5 and 5 parts of the polymer for grafting obtained in Reference Example 1 were charged in a mixer (Raboplast Mill) and the mixture was kneaded and reacted at 180° C. for 30 minutes to obtain a polymer-grafted carbon black master batch (10) having a graft polymer content of 50% by weight. 19 Parts of the master batch (10), 80 parts of polyvinylidene fluoride (KYNAR710), 2.9 parts of a fluorine elastomer (Cefral Soft G-180) and 5 parts of polyether ester (Hytrel 3078 manufactured by du Pont-Toray Co., Ltd.) were mixed with each other using a dual axix roll mixer and the resulting moderately electrically conducting composition was processed in the same manner as that in Example 9 to obtain an endless seamless belt. The belt was measured for its volume resistivity at various positions thereof. It was found that the resistivity of the belt ranged from $1.2 \times 10^9$ to $8.2 \times 10^9$ (at impressed voltage of 250 V) in the same belt. The ratio of the volume resistivity of the seamless belt after the test to the volume resistivity thereof before the test was found to be 5.6.

EXAMPLE 11

16.8 Parts of the master batch (10) obtained in Example 10, 80 parts of polyvinylidene fluoride (KYNAR710), 4.8 parts of a fluorine elastomer (Cefral Soft G-180), 5 parts of polyether ester amide (PAS40T) and 0.3 part of lithium perchlorate were mixed with each other using a dual axix roll mixer and the resulting moderately electrically conducting composition was processed in the same manner as that in Example 9 to obtain an endless seamless belt. The belt was measured for its volume resistivity at various positions thereof. It was found that the resistivity of the belt ranged from $6.8 \times 10^8$ to $5.5 \times 10^9$ (at impressed voltage of 250 V) in the same belt. The ratio of the volume resistivity of the seamless belt after the test to the volume resistivity thereof before the test was found to be 3.6.

Comparative Example 4

Example 9 was repeated in the same manner as described except that the master batch (9) was used in an amount of 8.2 parts and that no polyether resin was used, thereby obtaining an endless seamless belt. The belt was measured for its volume resistivity at various positions thereof. It was found that the resistivity of the belt ranged from $9.2 \times 10^9$ to $2.3 \times 10^{11}$ (at impressed voltage of 250 V) in the same belt. The ratio of the volume resistivity of the seamless belt after the test to the volume resistivity thereof before the test was found to be 15.7.

The endless seamless belt obtained from the composition containing a thermoplastic fluorine-containing resin, polymer-grafted carbon black, a thermoplastic polyether resin and, preferably, an electrolyte shows uniform volume resistivity throughout the whole body thereof and can maintain the moderately electrically conducting property even after environment dependency tests and repeated voltage impression tests and, hence, is very suited for use as an intermediate image transfer element for an electrophotographic image forming apparatus such as a copying machine, a printer or a facsimile.

A process and an apparatus for forming an image using an intermediate image transfer element are disclosed in, for example, U.S. Pat. No. 5,243,392, disclosure of which is hereby incorporated by reference herein.

The teachings of Japanese Patent Applications No. H9-185278 and No. H10-320091, filed Jul. 10, 1997 and Nov. 11, 1998, respectively, and entitled "Moderately Electrically Conducting Fluorine Resin Composition" and "Moderately Electrically Conducting Seamless Belt", respectively, inclusive of the specification, claims and drawings, are hereby incorporated by reference herein.

What is claimed is:

1. A resin composition comprising 100 parts by weight of a thermoplastic fluorine-containing resin, 1–40 parts by weight of polymer-grafted carbon black, 1–15 parts by weight of a thermoplastic polyether resin, and 0–2 parts by weight of an electrolyte, wherein the polymer of said polymer-grafted carbon black consists of a polymer chain of a monomer having a polymerizable double bond, wherein said monomer is at least one member selected from the group consisting of alkyl acrylates, alkyl methacrylates, styrene, vinyl acetate and olefins, and wherein said polymer chain is directly bonded to the carbon black.

2. A resin composition comprising 100 parts by weight of a thermoplastic fluorine-containing resin, 1–40 parts by weight of polymer-grafted carbon black, 1–15 parts by weight of a thermoplastic polyether resin, and 0–2 parts by weight of an electrolyte, wherein the polymer of said polymer-grafted carbon black consists of a polymer chain of a monomer having a polymerizable double bond, and a linkage through which said polymer chain is bonded to the carbon black and which is obtained from a bifunctional monomer having both an active group capable of bonding to the carbon black and a polymerizable double bond, wherein said monomer is at least one member selected from the group consisting of alkyl acrylates, alkyl methacrylates, styrene, vinyl acetate and olefins.

3. A composition as claimed in claim 2, wherein said bifunctional monomer is at least one alkyl acrylate or alkyl methacrylate selected from the group consisting of glycidyl acrylate, glycidyl methacrylate, oxazoline acrylate, and oxazoline methacrylate.

4. A composition as claimed in claim 2, wherein said electrolyte is at least one member selected from the group consisting of thiocyanates, halides and halogen-containing oxyacid salts.

5. A composition as claimed in claim 2, wherein said polyether resin is at least one member selected from the group consisting of polyether ester and polyether ester amide.

6. A composition as claimed in claim 2, and having a volume resistivity of $10^5$–$10^{12}$ Ω·cm.

7. A molded article of a composition according to claim 2.

8. A composition as claimed in claim 1, wherein said monomer is at least one alkyl acrylate or alkyl methacrylate selected from the group consisting of glycidyl acrylate, glycidyl methacrylate, oxazoline acrylate, and oxazoline methacrylate.

9. A composition as claimed in claim 1, wherein said electrolyte is at least one member selected from the group consisting of thiocyanates, halides and halogen-containing oxyacid salts.

10. A composition as claimed in claim 1, wherein said polyether resin is at least one member selected from the group consisting of polyether ester and polyether ester amide.

11. A composition as claimed in claim 1, and having a volume resistivity of $10^5$–$10^{12}$ Ω·cm.

12. A molded article of a composition according to claim 1.

* * * * *